United States Patent
Mihara et al.

(10) Patent No.: US 7,959,301 B2
(45) Date of Patent: Jun. 14, 2011

(54) PROJECTION DISPLAY DEVICE AND DISPLAY METHOD

(75) Inventors: Hisayuki Mihara, Kodama-Gun (JP); Kohei Watanabe, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 424 days.

(21) Appl. No.: 12/180,131

(22) Filed: Jul. 25, 2008

(65) Prior Publication Data

US 2009/0033881 A1 Feb. 5, 2009

(30) Foreign Application Priority Data

Jul. 31, 2007 (JP) .................................. 2007-199593

(51) Int. Cl.
*G03B 21/14* (2006.01)
(52) U.S. Cl. .............................. 353/70; 353/69; 348/746
(58) Field of Classification Search .................... 353/69, 353/70, 121, 122; 348/744, 745, 746, 806
See application file for complete search history.

(56) References Cited

U.S. PATENT DOCUMENTS 6,652,104 B2 * 11/2003 Nishida et al. .................. 353/70

FOREIGN PATENT DOCUMENTS

| JP | 2004104445 | 4/2004 |
| JP | 2004120614 | 4/2004 |
| JP | 2005159425 | 6/2005 |
| JP | 2007-17537 | 1/2007 |

* cited by examiner

*Primary Examiner* — Kevin Pyo
(74) *Attorney, Agent, or Firm* — Blakely, Sokoloff, Taylor & Zafman LLP

(57) ABSTRACT

According to one embodiment, a projection display device comprises a light modulator configured to receive light from a light source and emit an optical image modulated based on an image signal, a projector configured to project the optical image emitted from the light modulator onto a screen, and a correction unit configured to correct a distortion of the optical image which is projected onto the screen with an optical axis of the projector being not perpendicular to the screen, wherein the correction unit corrects the optical image which is projected onto the screen so that a shape of the optical image becomes a rectangle and any one of boundary sides of a rectangular optical image is aligned with a long boundary side of a trapezoidal projectable area of the projector.

8 Claims, 9 Drawing Sheets

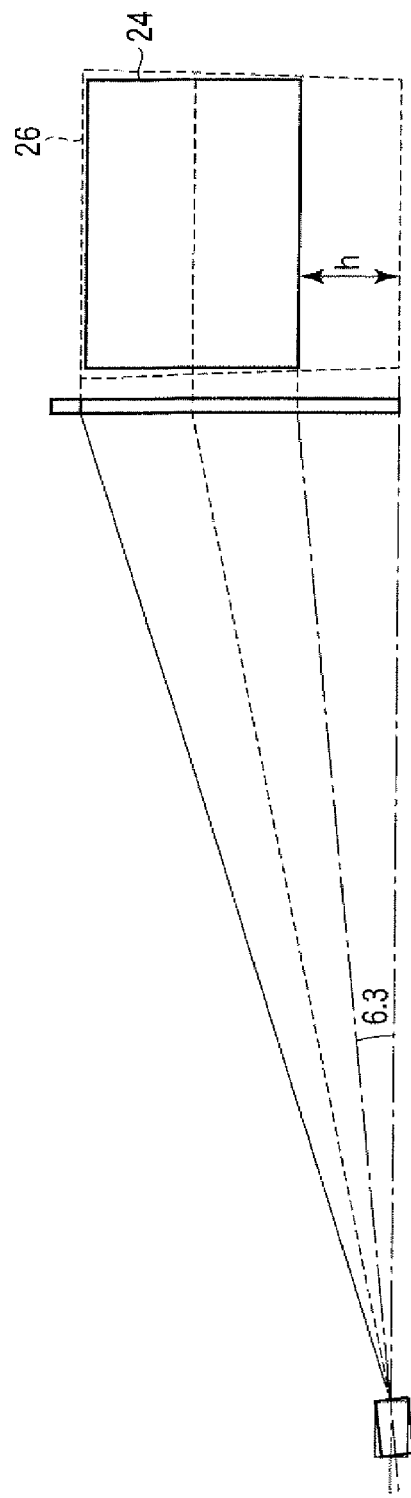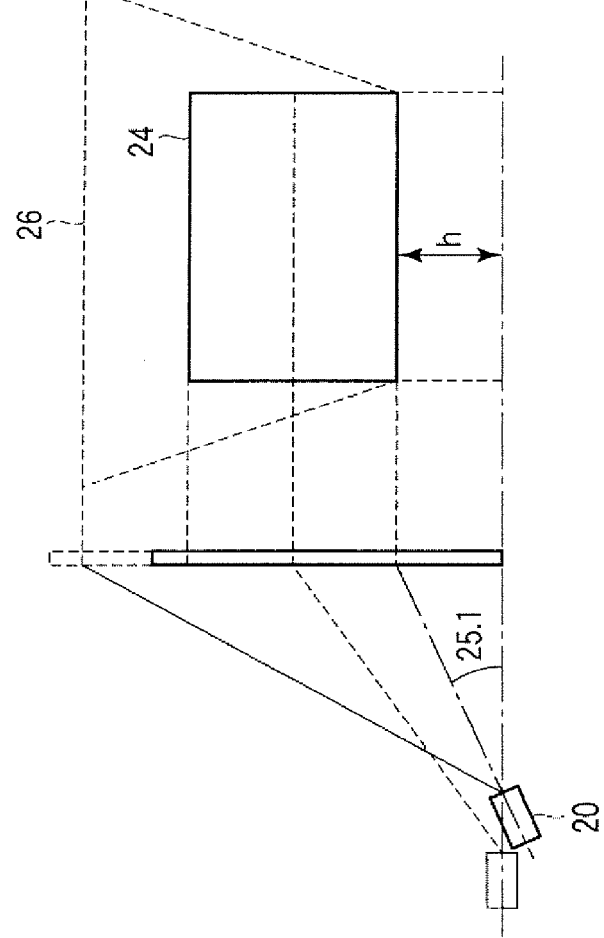
FIG. 3A
FIG. 3B

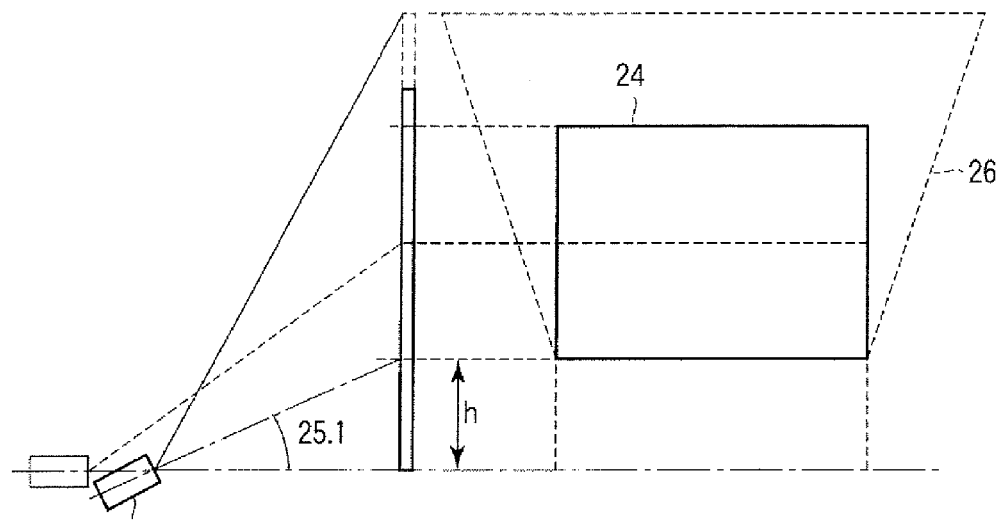
F I G. 4A
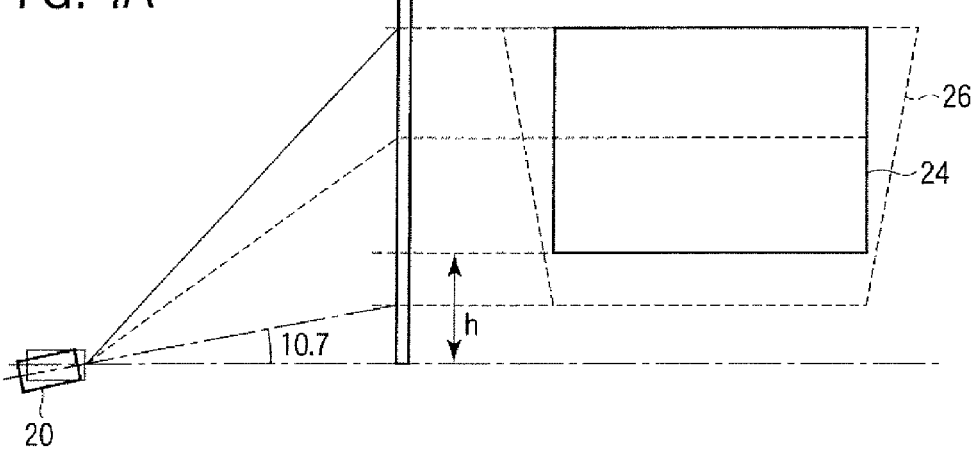
F I G. 4B
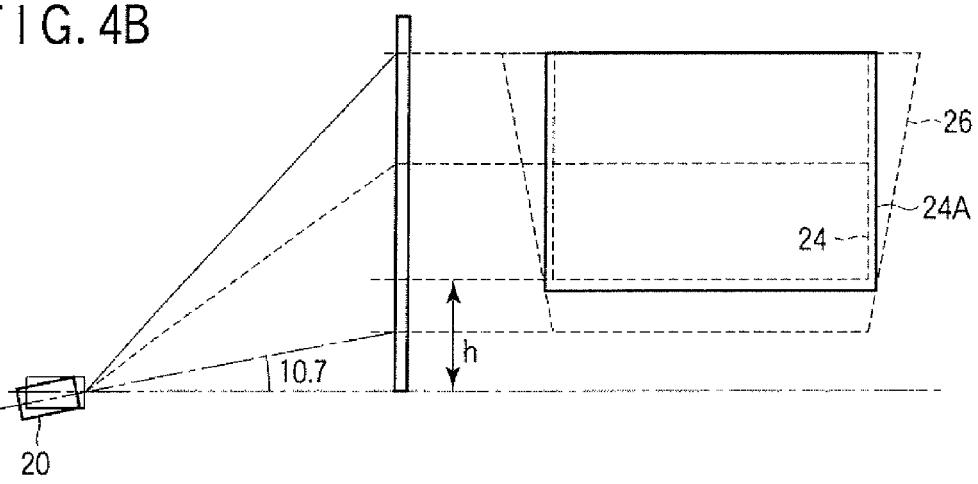
F I G. 4C

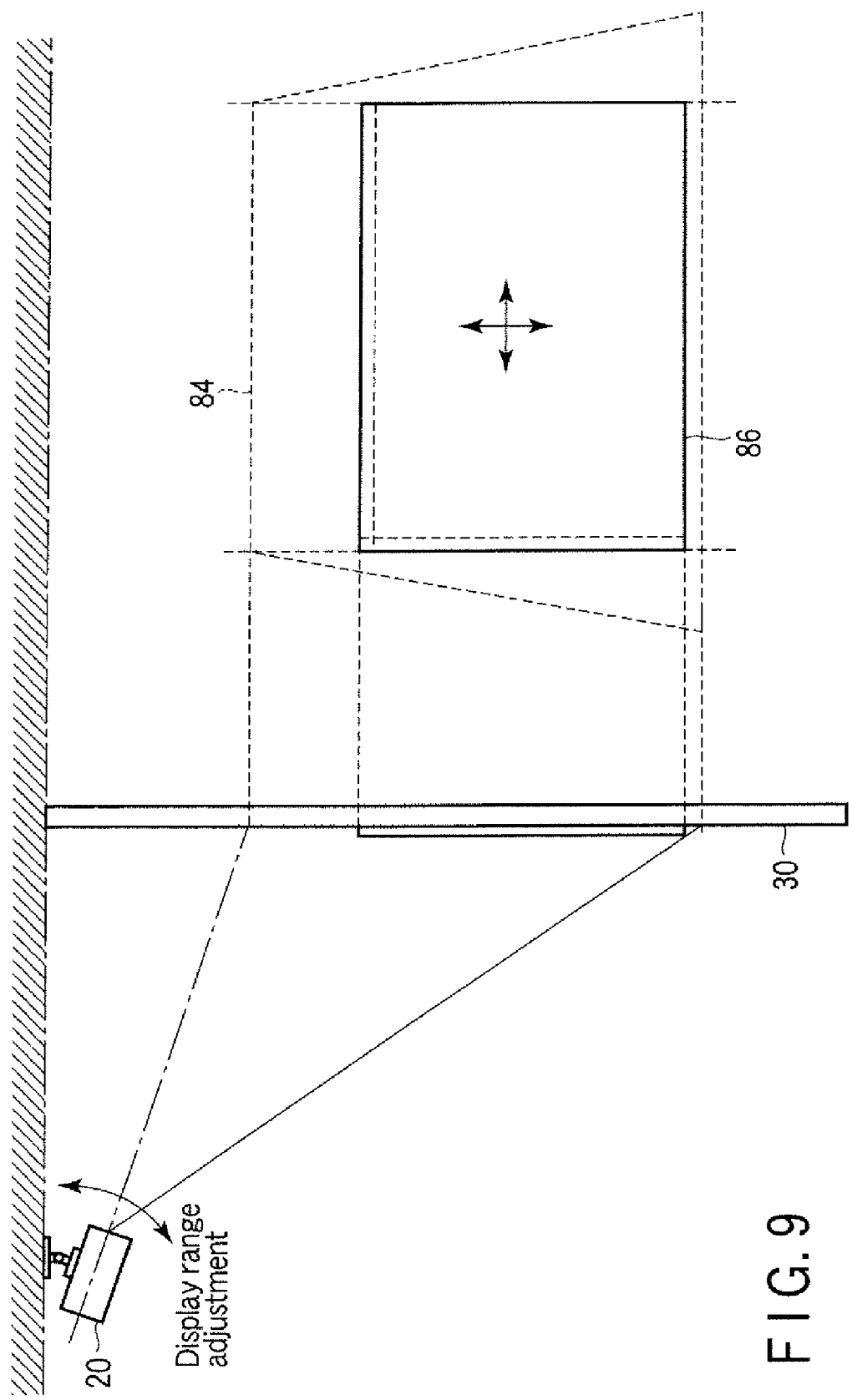
F I G. 9

PROJECTION DISPLAY DEVICE AND DISPLAY METHOD

CROSS-REFERENCE TO RELATED APPLICATIONS

This application is based upon and claims the benefit of priority from Japanese Patent Application No. 2007-199593, filed Jul. 31, 2007, the entire contents of which are incorporated herein by reference.

BACKGROUND

1. Field

One embodiment of the present invention relates to a projection display device and a display method.

2. Description of the Related Art

Conventionally, projection display devices which use liquid crystal light valves and digital micromirror devices (DMDs) are known. For example, a projection display device uses a projective liquid crystal panel (liquid crystal light valve) as light modulating means. Such a display device separates white light emitted from a light source into three primary color light beams, modulates the respective separated color light beams via the liquid crystal light valve so as to project an optical image transmitted through the liquid crystal light valve onto a screen via a projection lens.

In such a projection display device, when an optical image is projected from a front of a screen with a projection device aligned with a center of the screen, a rectangular-shaped optical image is projected because an optical axis is perpendicular to the screen. In most of devices which are called as front projectors for projecting from a front of the screen, however, the optical axis of the projection lens and the center of the light valve are shifted to up-down and right-left directions by any amount in order to allow all observers to easily see a projected image. In such a manner, offset projection is carried out optically in any direction. It is, however, difficult to realize a large shift using optical means.

In order to further shift a projection range, therefore, a projection device is arranged below the center of the screen, and the optical axis of the projection lens is directed obliquely upward so that extended projection is carried out. This is one kind of projection systems which is generally called as "shifting projection", and in this system, an image is projected above the center of the projection lens. The shifting projection includes vertical shifting projection for projecting an image upward, horizontal shifting projection for projecting an image in a horizontal direction, and projection where they are mixed.

In the case of the upward shifting projection, an image projected onto a screen extend upward toward the upper portion, and are widened in a horizontal direction so that the image is distorted into an inverted trapezoidal shape (keystone distortion). It is considered that the keystone distortion due to the shifting projection is corrected by a signal processing (for example, Jpn. Pat. Appln. KOKAI Publication No. 2004-120614 (paragraphs 0005 to 0007), and Jpn. Pat. Appln. KO AI Publication No. 2007-17537 (paragraphs 0003 to 0004)).

In the keystone correction described in these two patent documents, an optical image which transmits through a liquid crystal light valve is distorted in advance in a manner opposite to a distortion, and thus a rectangular image is projected. That is to say, since a rectangular image is distorted into an inverted trapezoidal image when it is projected, the optical image is corrected to have a trapezoidal shape before it is projected.

The optical image is, however, corrected so that a lower side of an inverted-trapezoidal projectable area (short boundary side) matches a lower side of a corrected rectangular projected image. For this reason, the degree of a reduction in the optical image due to the correction does not become a problem within a general projection distance where a focal distance is long. However, in short-focus display devices which are applied to intelligent boards and whose maximum field angle exceeds 40°, the entire device should be greatly tilted due to a shift in a slight projection range (tilt angle: about 25.1°), and also a projected image after keystone correction becomes a small part of a projectable area where the display device can display an image. An effective light flux is reduced (image darkens), and the number of effective display pixels is reduced (image definition deteriorates). Further, various secondary issues are likely to arise due to presence of a large unnecessary light (stray light) area.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 3A and 3B are exemplary diagrams illustrating a difference between a projectable area and an actual projected image due to a difference in a projection distance;

FIGS. 4A, 4B, and 4C are exemplary diagrams illustrating a keystone correction principle according to an embodiment of the present invention;

FIG. 9 is an exemplary diagram illustrating an application example where a display position of the projected image is electrically fine-adjusted according to the embodiment of the present invention.

DETAILED DESCRIPTION

Various embodiments of projection display device and a display method according to the invention will be described hereinafter with reference to the accompanying drawings. In general, according to one embodiment of the invention, a projection display device comprises a light modulator configured to receive light from a light source and emit an optical image modulated based on an image signal, a projector configured to project the optical image emitted from the light modulator onto a screen, and a correction unit configured to correct a distortion of the optical image which is projected onto the screen with an optical axis of the projector being not perpendicular to the screen, wherein the correction unit corrects the optical image which is projected onto the screen so that a shape of the optical image becomes a rectangle and any one of boundary sides of a rectangular optical image is aligned with a long boundary side of a trapezoidal projectable area of the projector.

Figure 1A:
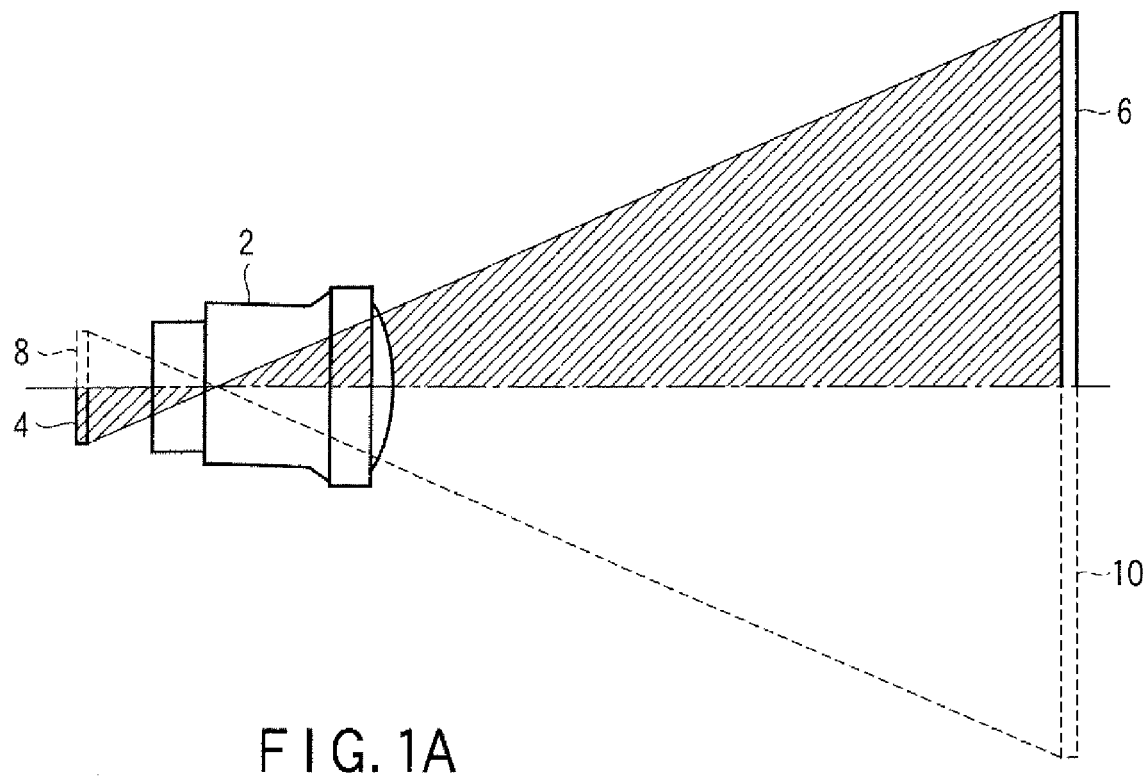
FIGS. 1A, 1B, and 1C are exemplary diagrams illustrating an optical offset principle to be used in a projection display device.
Figure 1B:
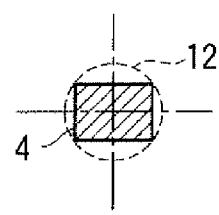
Figure 1C:
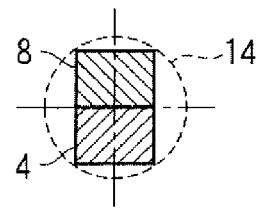

FIGS. 1A to 1C illustrate an optical offset projection principle. As shown in FIG. 1A, when an optical axis of a projection lens 2 is matched with a lower end of an active area 4 of a light valve (since a projected image is generally inverted, the upper end of the active area 4 in FIG. 1A becomes a lower end of a display screen), an image of the active area 4 is projected onto a projection area 6 where the optical axis is the lower end. That is to say, the projection lens 2 has a structure such that an image of an inactive area (virtual area) 8 of the light valve can be projected onto a projection area 10 where the optical axis is an upper end.

When the projection lens 2 projects only an image in the active area 4 of the light valve as an original object onto the screen, as shown in FIG. 1B, an image area 12 as a projectable range of the projection lens 2 may be circular which covers the active area 4. Normally, since the projection lens has a spherical structure, the image area is also circular.

In this state, however, since the optical axis of the projection lens 2 matches the center of the projected image, the projected image may be hidden by a table on which the display image is placed or the device main body. For this reason, as shown in FIG. 1C, the image area 14 of the projection lens 2 is extended, and the optical axis of the projection lens 2 and the center of the light valve are offset by any amount. As a result, the projected image is optically shifted, and thus the defect such that the projected image is hidden by the table on which the display device is placed and the device main body is avoided.

However, since this requires the extension of the image area of the projection lens according to the degree of shift, this means mostly influences the shape, cost and performance (projection distance). As a result, it is difficult to realize a large shift.

Figure 2A:
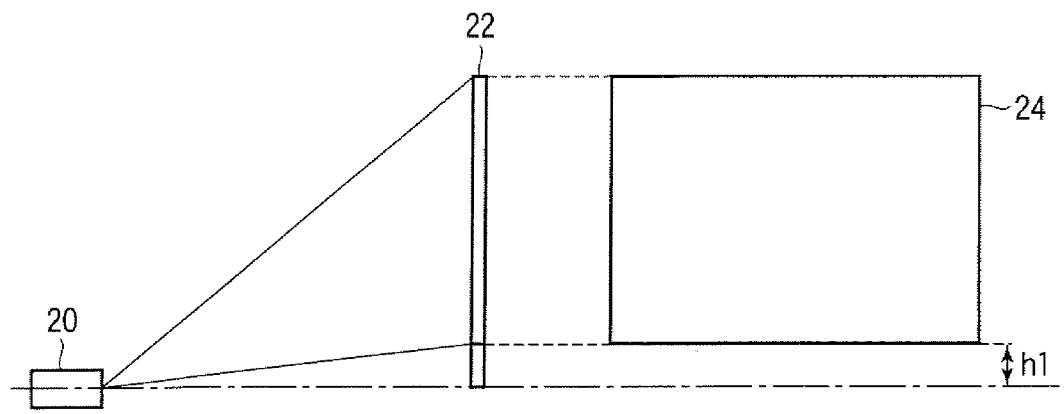
FIGS. 2A and 2B are exemplary diagrams illustrating a shifting projection principle to be used in the projection display device.
Figure 2B:
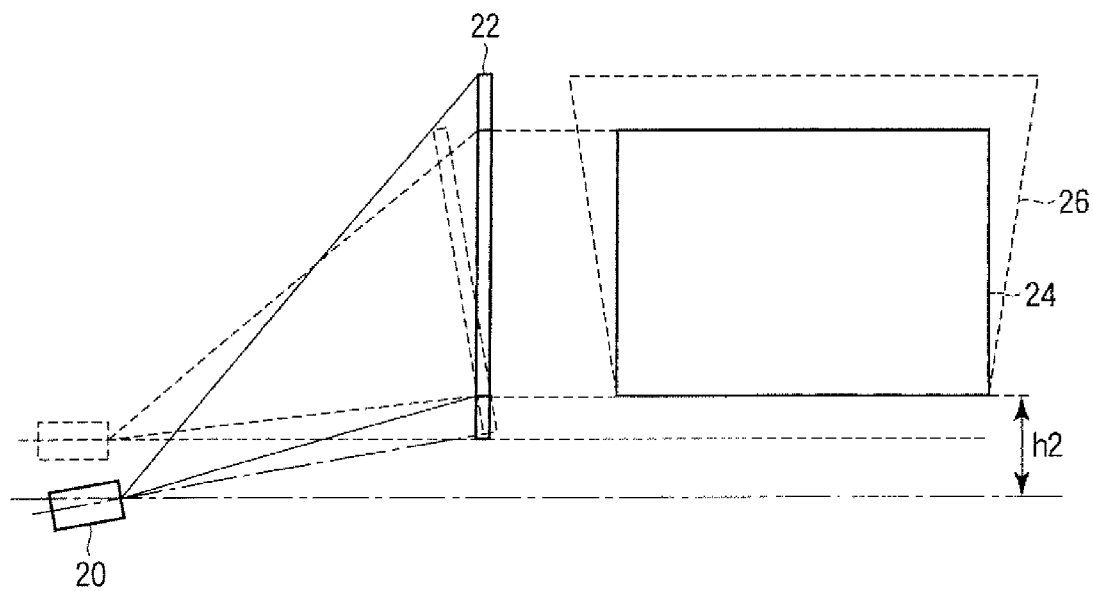

For this reason, in order to provide many observers' easier view in general use of front projectors, it is considered that the optical axis of a display device 20 is tilted from a horizontal direction by any amount as shown in FIG. 2B, namely, shifting projection is carried out, and only a projected image 24 is shifted upward only by h2. FIG. 2A illustrates optical offset projection according to the principle in FIGS. 1A to 1C where the optical axis of the display device 20 matches the horizontal direction. As shown in FIG. 2B, when the display device 20 is tilted with respect to the screen 22 by any angle (the optical axis of the display device 20 is offset from the center of the projectable area), the projection position is further shifted upward, so that the shift can be extended from h1 to h2. However, since the optical axis of the display device 20 is not perpendicular with the screen, an actual projected image 26 is further extended toward upper portions according to a tilt angle so that keystone distortion is generated.

The projected image 26 which is keystone-distorted due to the shifting projection is compressed and corrected according to a keystone correction processing as a signal processing so that the projected image 26 is equal with the projected image 24 in a normal projected state (the optical axis of the display device 20 matches the center of the screen 22, that is, is perpendicular to the screen).

As shown in FIG. 2B, the projected image 26 is corrected so that the lower boundary side of the corrected projected image 24 matches a lower boundary side (short side) of the inverted-trapezoidal projectable area 26. The degree of a reduction in an optical image due to this correction (difference between the projectable area 26 and the actual corrected projected image 24) does not become a problem within a general projection distance shown in FIG. 3A where the focal distance is long (about 5 m or more). However, in a short focal (within about 2 m) display device which is applied to the intelligent board shown in FIG. 3B and whose maximum field angle exceeds 40°, the entire device should be greatly tilted (tilt angle: about 25.1°) for slight projection area shift, and also the projection area of an optical image after the keystone correction becomes a small portion of the projection area where the display device can originally display an image.

The following two issues are noticeable because a small part of the entire projected light flux of the projectable area 26 becomes the projected image (display area) 24:

(1) the effective light flux decreases (image darkens); and
(2) the number of effective display pixels decreases (image definition deteriorates). Further, various secondary issues are likely to arise due to the presence of an unnecessary light (stray light) area.

FIGS. 4A to 4C are diagrams for explaining the principle according to the embodiment of the present invention which solves the above-described issues. FIG. 4A is the same as FIG. 3B.

In the embodiment of the present invention, as shown in FIG. 4B or 4C, the keystone correction is made based on a long boundary side (side distant from the optical axis or an upper side in the shift direction) of the inverse-trapezoidal projectable area 26. That is to say, the correction is made so that the upper boundary side of the projected image 24 is aligned with the upper boundary side of the projectable area 26. For this reason, the proportion of the projected image (display area) 24 after the keystone correction to the projectable area 26 where the display device can originally display an image can be increased. As a result, a determination can be sufficiently made by visual comparison that the brightness and the number of the effective pixels are improved nearly double-fold. Further, since the projected image 24 is projected to an upper side of the shift direction, when a shift h which is the same as the conventional one is attempted, the angle by which the display device 20 is tilted with respect to the screen 20 may be small (reduced from 25.1° to 10.7°). The small tilt angle is preferable from the viewpoint of the lamp's operational stability. It is assumed that the lamp is used in a horizontal state, and when the lamp is tilted much, the operation becomes unstable.

FIG. 4B illustrates a case where a lateral width of the projected image 24 is the same as the conventional one (same as the short boundary side of the trapezoidal projectable area 26). In FIG. 4B, the lateral width of the lower side of the projected image 24 does not touch oblique sides of the trapezoid which are not parallel to the lower side, and thus the projected image can be slightly extended. FIG. 4C illustrates a case where the lateral width of a projected image 24A is set maximally within a range where an aspect ratio of the image does not change (both ends of the lower boundary side of the projected image 24A near the optical axis of the display device touch the oblique sides of the trapezoidal projectable area 26). In the case of FIG. 4C, since the projected image is extended maximally, the brightness and the number of the effective pixels are improved very much. In FIG. 4B, since a slight place is left for extension, the brightness and the number of the effective pixels are slightly inferior to those in the case of FIG. 4C. However, since margins are left in the horizontal direction, even when displacement after installation occurs as mentioned later, display is not missed.

Figure 5:
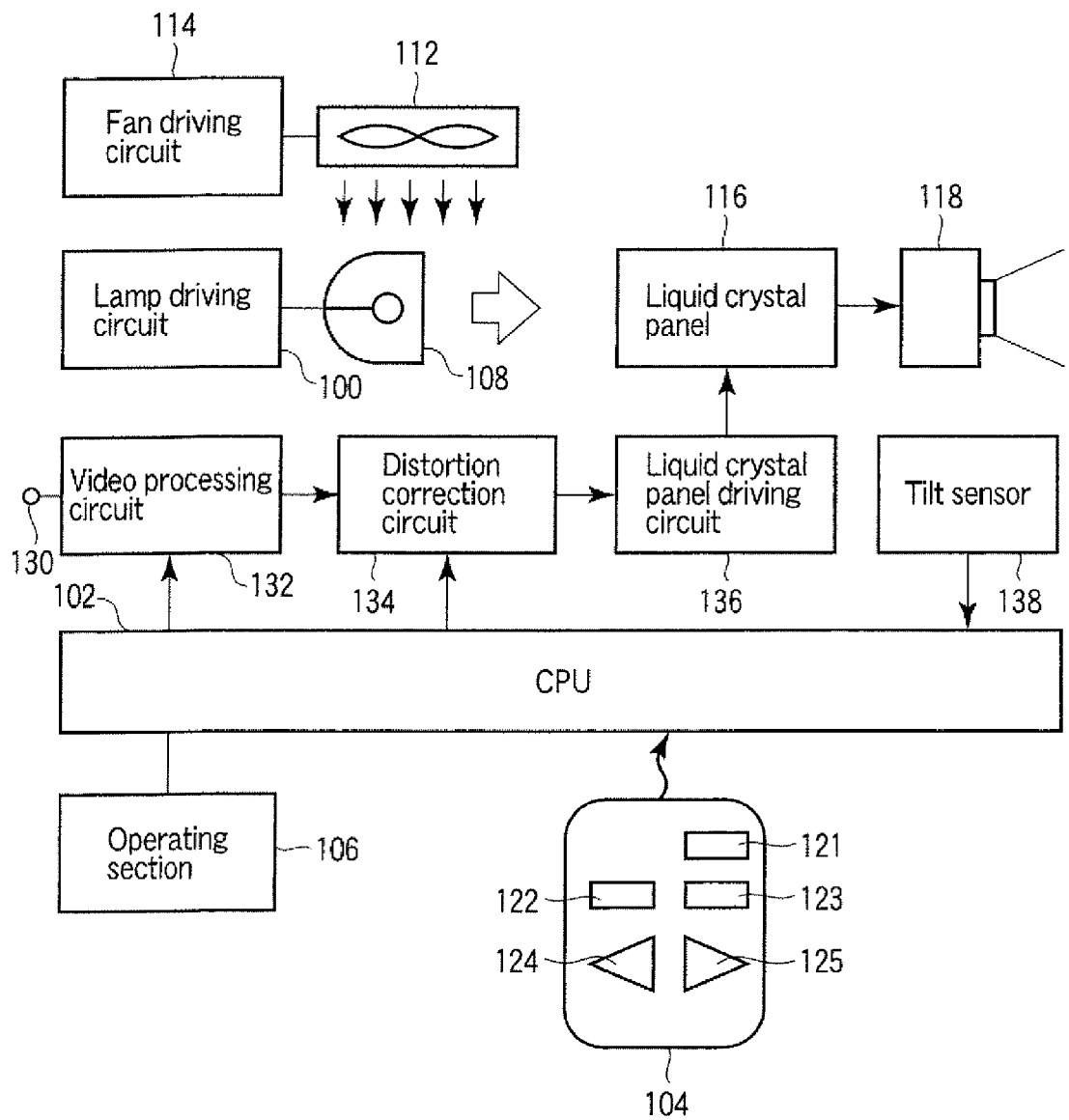
FIG. 5 is an exemplary block diagram illustrating a circuit configuration of the projection display device according to the embodiment of the present invention.

FIG. 5 is a block diagram illustrating the projection display device according to one embodiment of the present invention.

A microcomputer (CPU) 102 which controls the operation of the display device is provided. The CPU 102 is provided with an input circuit (not shown) which receives instructions from a remote controller 104 and an operating section 106.

The display device has a lamp driving circuit 100 which turns on/off a light source lamp 108, a fan driving circuit 114 which drives a fan 112 for cooling the light source lamp 1083 and a liquid crystal panel (light valve) 116. The display device irradiates the liquid crystal panel 116 with light from the light source lamp 108. A signal input terminal 130 is connected to a video processing circuit 132, and a video signal obtained by receiving and processing a television broadcast signal and an information signal from a personal computer are input to the video processing circuit 132 from the signal input terminal 130.

The signal from the video processing circuit 132 is supplied to a liquid crystal panel driving circuit 136 via a distortion correction circuit 134, and the liquid crystal panel 116 is driven by the liquid crystal panel driving circuit 136. As a result, the intensity of transmitted light of the liquid crystal panel 116 is modulated, and an optical image from the liquid crystal panel 116 is projected to be displayed on the screen (not shown) via a projection lens 118. The distortion correction circuit 134 is an API section, and it has a lookup table.

A single type liquid crystal panel may be used, but a multiple type liquid crystal panel which uses a plurality (for example, 3) of liquid crystal panels may be used as the liquid crystal panel 116. In the case of the multiple type, the three liquid crystal panels are driven by primary color signals of red (R), green (G) and blue (B), and the light from the light source lamp is divided into R, G and B components so that they enter the liquid crystal panels, respectively. The transmitted light through the liquid crystal panels are again synthesized so as to be projected onto the screen.

Reference number 138 is a tilt sensor, and serves as an angle sensor which measures a tilt angle of the display device in a vertical direction. A detected result of the tilt sensor 138 is supplied to the CPU 102, and data about the tilt angle is supplied to the distortion correction circuit 134. The distortion correction circuit 134 corrects a video to be displayed on the liquid crystal panel 116 according to the tilt angle in order to correct distortion due to vertical shifting projection.

The remote controller 104 has a power source key 121, a menu key 122, an automatic trapezoidal distortion correction key 123, and correction keys 124 and 125 which manually correct distortion of a trapezoid.

Figure 6A:
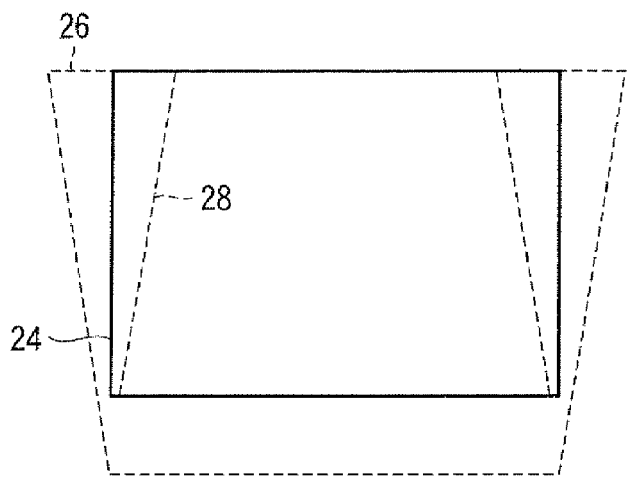
FIGS. 6A and 6B are exemplary diagrams illustrating keystone corrected images according to the embodiment of the present invention.
Figure 6B:
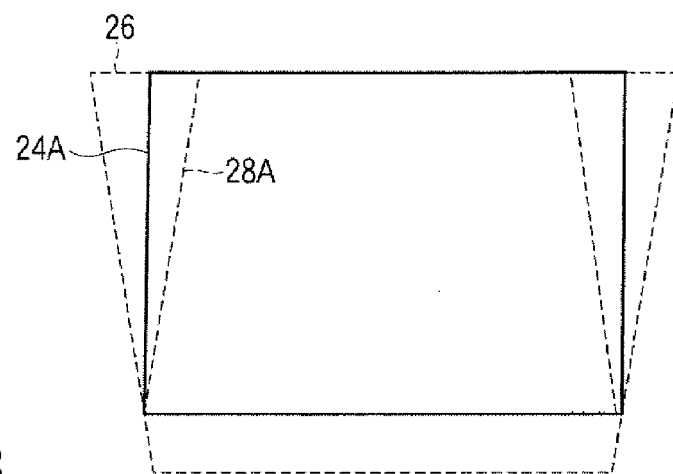

The keystone correction of the projection display device is described below with reference to FIGS. 6A and 6B. When a rectangular optical image output from the liquid crystal panel 116 is subject to vertical shifting projection, an upper end of the projected image in the vertical direction extends upward toward the upper portion as shown in FIG. 4A, and the projected image is widened in the horizontal direction toward upper portions. As a result, the projected image is entirely distorted to have an inverted trapezoidal shape. For this reason, the distortion correction circuit 134 deforms the display image on the liquid crystal panel 116 to have a shape opposite to the keystone distortion, so that the corrected projected image can be made to be rectangular. Since the distortion shape accords with the tilt angle (shift angle, shifting angle) of the device, the distortion correction circuit 134 controls the shape of the display image on the liquid crystal panel 116 for correction based on the tilt angle (in FIGS. 4B and 4C, 10.7°) detected by the tilt sensor 138. The shape of the corrected image to be displayed on the liquid crystal panel 116 is shown in FIGS. 6A and 6B. FIGS. 6A and 6B illustrate the shapes of the corrected images 28 and 28A when the correction in FIGS. 4B and 4C is made.

The corrected images 28 and 28A do not reduce in the vertical direction but reduce only in the horizontal direction. The degree of reduction is the smallest on the lower end portion (the width is great), and the image reduces in the horizontal direction toward the upper end portion so as to be missed (namely, black display). When the corrected images 28 and 28A are enlarged by distortion, an original rectangular projected image is projected. As the tilt angle detected by the tilt sensor 138 becomes larger, the projectable area 26 has an inverted trapezoidal shape with wide width, and thus the width becomes narrower than the short boundary side of the trapezoid of the corrected image.

When a projected image is distorted due to the vertical shifting projection, the automatic trapezoidal distortion correction key 123 provided to the remote controller 104 is pressed down. As a result, the CPU 102 responds to the key-pressing so as to control the distortion correction circuit 134 based on a measured result from the tilt sensor 138, and can make a correction as described with reference to FIGS. 6A and 6B.

In the case of horizontal shifting projection, not shown, the image in FIGS. 6A and 6B rotates 90°, but the others do not change. That is to say, in the case of shifting projection in the right direction, the image extends to the right direction, and is widened to the vertical direction toward the right end portion, so that the entire image is distorted to have a trapezoidal shape in which the long boundary side locates at the right end.

On the contrary, the distortion correction circuit 134 corrects a video signal to be supplied to the liquid crystal panel 116, and makes a control so that an image whose shape is deformed to compensate for the distortion of the projected optical image is displayed on the liquid crystal panel 116. That is to say, the right end side of the corrected image reduces in the vertical direction so that the display area is missed (namely, black display), and the length of the display area in the vertical direction becomes gradually longer toward the left end portion. As a result, the projected image is controlled to be an original rectangular image.

Such trapezoidal distortion due to the horizontal shifting projection is corrected in such a manner that a user presses down the trapezoidal distortion correction key 124 or 125 provided to the remote controller 104 and the CPU 102 controls the distortion correction circuit 134 in response to the key-pressing.

For example, in the case of shifting projection to the right direction with respect to the screen, the right trapezoidal distortion correction key 125 is pressed so that the correction is made. When the distortion amount is large, the number of operating times of the key 125 is increased, so that the correction amount of the corrected image is increased. Therefore, the user can make correction so that the projected image approaches the regular rectangular image while viewing the projected image. In the case of the shifting projection to the left direction, the left trapezoidal distortion correction key 124 is pressed down so that the image distortion can be corrected.

Figure 7:
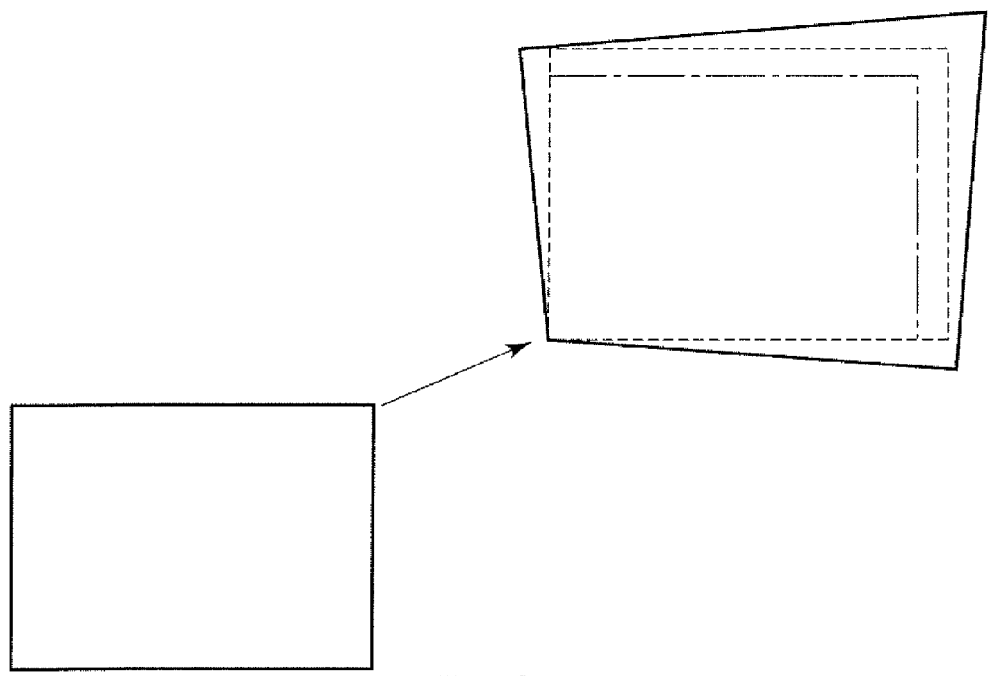
FIG. 7 is an exemplary diagram illustrating a corrected image at the time of shifting projection in an oblique direction according to the embodiment of the present invention.

The description above refers to the shifting projection in the vertical or horizontal direction, but realistically in most cases, the shifting projection is carried out in both the vertical and horizontal directions. In a conventional manner, as shown by an alternate long and short dash line in FIG. 7, the correction is made so that any one of apexes of the corrected rectangular matches an apex of the distorted rectangular which is the closest to the optical axis. In this embodiment, however, as shown by a broken line in FIG. 7, the correction is made so that any three apexes of the corrected rectangular touch a boundary side of the distorted rectangular. FIG. 7 illustrates a case of shifting projection in an obliquely right direction. This increases the proportion of the projected image after the keystone correction to the projectable area where the display device can originally display an image, and thus produces the effect similar to the above one.

The vertical shifting projection distortion is automatically corrected according to the tilt angle, but the horizontal shifting projection distortion is corrected manually. This is because since the actual projection distortion has a complicated shape, the automatic correction operation is difficult, and detection means which detects a tilt of the display device in the horizontal direction with respect to the screen is not provided. Even if the detection means is provided, the constitution becomes complicated.

The method for correcting trapezoidal distortion is described in detail below.

In general, the digital image signals of R, G and B are temporarily stored in a frame memory or the like in the video processing circuit 132, and each of the stored image signal for one screen is read and output in writing order The image signals are sequentially written into the corresponding pixels of the liquid crystal panel 116, respectively. The reading from the frame memory is controlled so that the shape of the video to be displayed on the liquid crystal panel 116 can be corrected into any shape.

For example, in the case of the correction in FIG. 6B, an image is displayed on all the pixels on the horizontal line at the lowest end of the liquid crystal panel, and the area where the pixels on the right and left sides are not driven may be widened toward the upper end portion. As a result, the image 24A corrected into a rectangular image is displayed on the screen.

Since the number of pixels where an image is displayed is reduced on the upper end portion of the liquid crystal panel, right and left portions are missed from a normal video, so that the image is distorted. Therefore, data of the video signal to be displayed on the upper end of the screen is compressed, so that the data for one line is displayed on the small number of pixels. The data compressing degree is reduced on the center portion of the screen, and the video signal is not compressed on the lower end portion of the screen, so that data for one line may be displayed normally.

Figure 8:
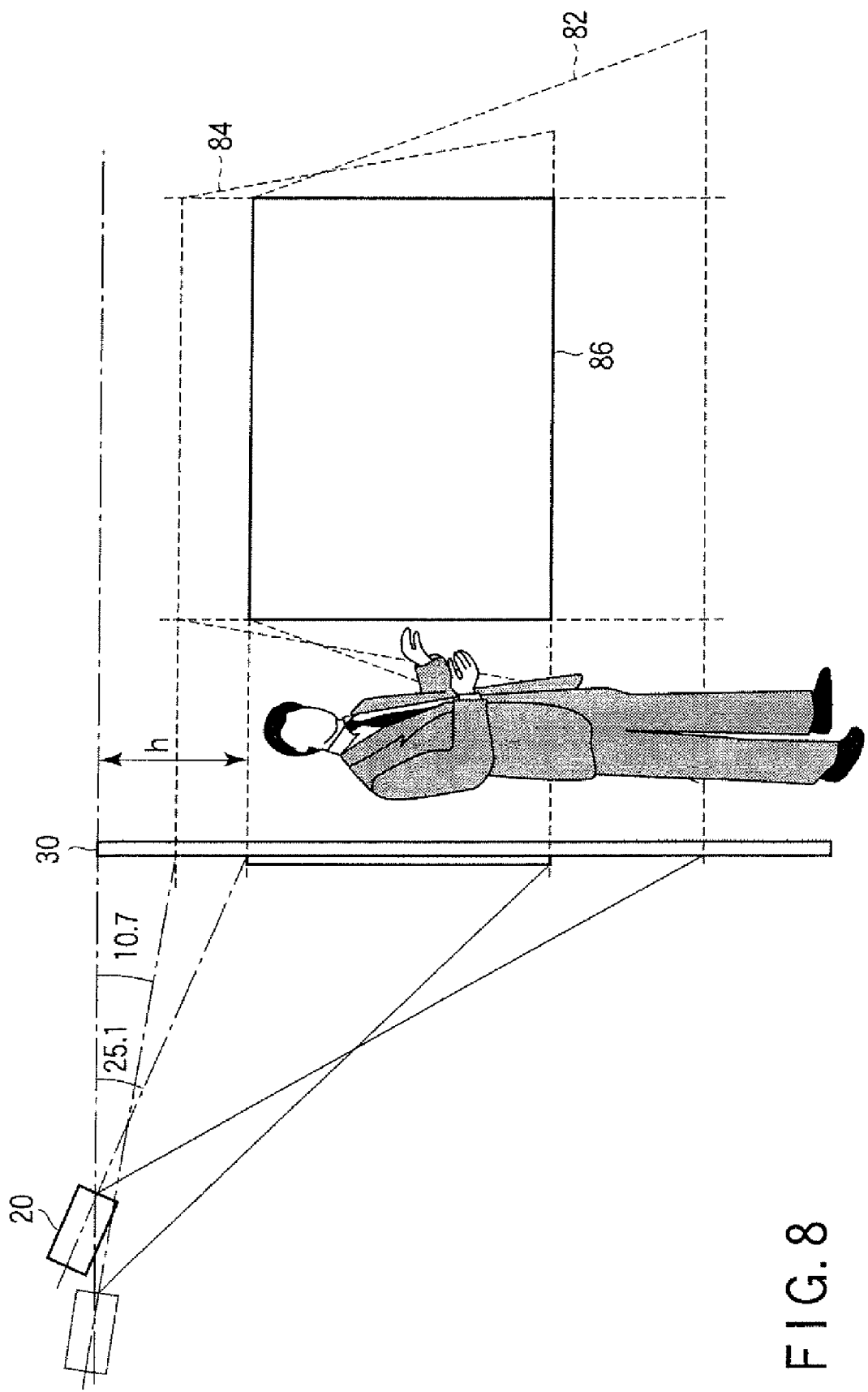
FIG. 8 is an exemplary diagram illustrating a suspension use state according to the embodiment of the present invention.

FIG. 8 illustrates an application example in a suspension use state where the display device 20 according to the embodiment is fixed to a ceiling. In the case of the suspension installation, not only the projection display device but also the display screen 30 is fixed generally. Reference number 82 is the projectable area in the conventional example of FIG. 4A, and reference number 84 is the projectable area according to the embodiment. A corrected projected image 86 in the embodiment is shifted by h from the ceiling by optical offset and shifting projection.

When the display device 20 is fixed to the ceiling with respect to the fixed screen 30 set to a predetermined position as shown in FIG. 8, the projectable area is greatly shifted even by a slight angle fluctuation of the main body according to the magnifying power (screen size) of the projection display device. However, it is very difficult to accurately fit the projection display device to the screen size and the position at the time of installation.

FIG. 9 illustrates an example where it is easy to fit the projection display device to the screen size and the position even if an angle of the main body is slightly fluctuated. After the correction shown in FIG. 4B is made, the display position of the projected image 86 can be electrically and finely adjusted in an allowance range of the projectable area 84 maintained slightly. In this case, after a worker roughly sets the projectable area 84, the display position of the projected image 86 can be accurately fitted to the screen by means of the image processing using the remote controller or the like.

Figure 10:
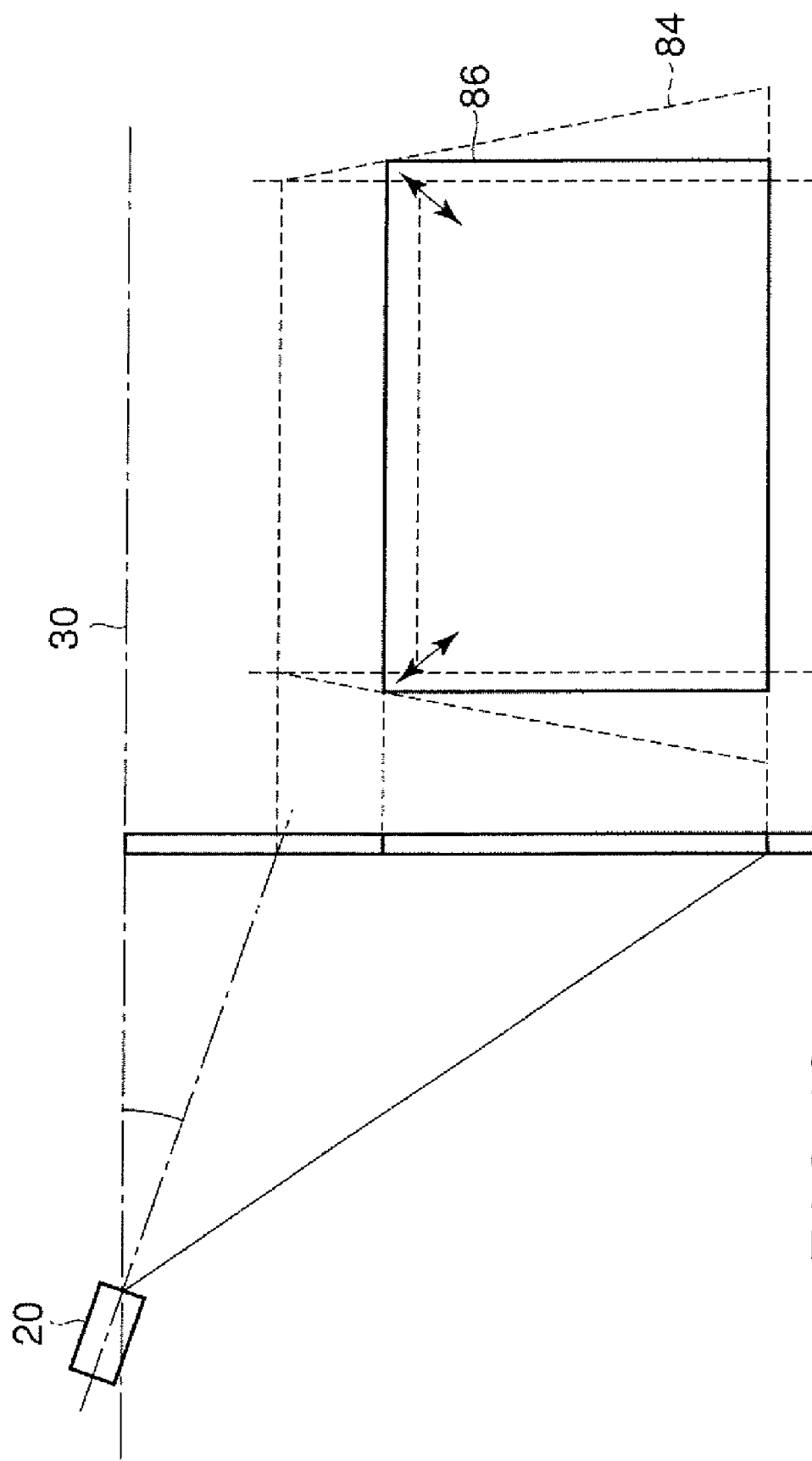
FIG. 10 is an exemplary diagram illustrating an application example where a magnifying power of the projected image is electrically fine-adjusted according to the embodiment of the present invention.

At this time, when the projection display device has an optical zoom function, the size can be accurately adjusted by means of the optical zoom, but some of short focal display devices which are usually fixed to the ceiling do not have the optical zoom In this case, as shown in FIG. 10, as to the projected image 86 after keystone correction, the right, left, up and down positions can be shifted, and also the projectable area can be electrically zoomed within the allowance range of the projectable area 84. For this reason, the worker can easily install the projection display device.

According to this embodiment, since only the video display area (position of the projected image) in the projectable area (=light valve active area) is changed, basically an application program interface (API) section may be changed. For this reason, the shifting angle (tilt angle) in the conventional keystone correction can be reduced without requiring the rise in the cost and additional members.

As a result:
1. since the proportion of the actual projected image to the projectable area increases, brighter projection display can be realized in display devices having the same optical characteristics;
2. since the proportion of the actual projected image to the projectable area increases, effective resolution is improved, namely, a defect such as deterioration in image quality is reduced; and
3. particularly in the suspension installation, when correction is made into a size which is equal to a display size after the conventional keystone correction, the projection position and the size after correction can be finely adjusted, and thus the installation becomes easy due to combination with the installation angle sensitivity reducing effect.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A projection display device comprising:
   a light modulator configured to receive light from a light source and emit an optical image modulated based on an image signal;
   a projector configured to project the optical image emitted from the light modulator onto a screen; and a correction unit configured to correct a distortion of the optical image which is projected onto the screen with an optical axis of the projector being not perpendicular to the screen,
wherein the correction unit corrects the optical image which is projected onto the screen so that a shape of the optical image becomes a rectangle and any one of boundary sides of a rectangular optical image is aligned with a long boundary side of a trapezoidal projectable area of the projector.

2. The projection display device according to claim 1, wherein the correction unit corrects the optical image which is projected onto the screen so that a length of any boundary side of the rectangular optical image is equal to the short boundary side of the trapezoidal projectable area.

3. The projection display device according to claim 2, further comprising a changing unit configured to change a display position of the optical image which is projected onto the screen within the trapezoidal projectable area.

4. The projection display device according to claim 1, wherein the correction unit corrects the optical image which is projected onto the screen so that both ends of a boundary side of the rectangular optical image which is close to the optical axis of the projector touch one of oblique boundary sides of the trapezoidal projectable area.

5. A display method for a projection display device comprising a light modulator configured to receive light from a light source and emit an optical image modulated based on an image signal, and a projector configured to project the optical image emitted from the light modulator onto a screen, the method comprising:
correcting a distortion of the optical image which is projected onto the screen with an optical axis of the projector being not perpendicular to the screen,
wherein the optical image which is projected onto the screen is corrected so that a shape of the optical image becomes a rectangle and any one of boundary sides of a rectangular optical image is aligned with a long boundary side of a trapezoidal projectable area of the projector.

6. The display method according to claim 5, wherein the optical image which is projected onto the screen is corrected so that a length of any boundary side of the rectangular optical image is equal to the short boundary side of the trapezoidal projectable area.

7. The display method according to claim 6, further comprising changing a display position of the optical image which is projected onto the screen within the trapezoidal projectable area.

8. The display method according to claim 5, wherein the optical image which is projected onto the screen so that both ends of a boundary side of the rectangular optical image which is close to the optical axis of the projector touch one of oblique boundary sides of the trapezoidal projectable area.

* * * * *